United States Patent
Loh et al.

(10) Patent No.: US 6,771,182 B1
(45) Date of Patent: Aug. 3, 2004

(54) WIRELESS REMOTE CONTROL FOR ALTERNATE CURRENT (A.C.) ELECTRICAL LIGHTING AND APPLIANCES WITH LEARN FUNCTION

(75) Inventors: Kuam Hong Loh, Penang (MY); Hong Keng Lim, Penang (MY); Suresh Kumar Sankar, Penang (MY)

(73) Assignee: Intelligent Control Technology (M) SDN BHD, Penang (MY)

( * ) Notice: Subject to any disclaimer, the term of this patent is extended or adjusted under 35 U.S.C. 154(b) by 500 days.

(21) Appl. No.: 09/711,657

(22) Filed: Nov. 13, 2000

(30) Foreign Application Priority Data

Nov. 15, 1999  (MY) ........................................ PI 9904948

(51) Int. Cl.[7] ........................ G08C 19/00; G05B 19/00; G06F 7/00; H04B 1/00; G08B 1/08
(52) U.S. Cl. ............................... 340/825.72; 340/5.23; 340/538
(58) Field of Search ................................. 340/538, 539, 340/310.02, 310.01, 825.22, 5.22, 5.23, 825.72, 825.69; 307/31; 455/92, 88

(56) References Cited

U.S. PATENT DOCUMENTS

| | | | |
|---|---|---|---|
| 4,200,862 A | | 4/1980 | Campbell et al. |
| 4,418,333 A | | 11/1983 | Schwarzbach et al. |
| 4,626,848 A | * | 12/1986 | Ehlers .................... 340/825.69 |
| 5,160,924 A | | 11/1992 | Conil et al. |
| 5,189,412 A | * | 2/1993 | Mehta et al. .......... 340/825.22 |
| 5,782,036 A | * | 7/1998 | Bertieri et al. ................. 49/25 |
| 5,815,086 A | * | 9/1998 | Ivie et al. .............. 340/825.52 |
| 6,163,275 A | * | 12/2000 | Hartzell ................. 340/825.72 |
| 6,249,673 B1 | * | 6/2001 | Tsui ............................ 455/92 |
| 6,297,746 B1 | * | 10/2001 | Nakazawa et al. ..... 340/825.69 |
| 6,567,032 B1 | * | 5/2003 | Mullaly et al. ............. 341/176 |

* cited by examiner

*Primary Examiner*—Michael Horabik
*Assistant Examiner*—Nam Nguyen
(74) *Attorney, Agent, or Firm*—Merchant & Gould, P.C.

(57) ABSTRACT

A wireless remote and infrared receivers for controlling AC appliances connected to the receivers, capable of leaning codes from other infrared remotes. The system can control light intensity, has a 24-hour programmable daily timer, a selectable sleep timer, and switching for appliances connected to the receivers. The system has an energy saving interval timer for heating and fan ventilation, and a transmitter capable of learning and unifying remotes for other home equipment into one master remote. As a safety measure the receiver has a mechanical bypass switch. The receiver may decode an activation/deactivation sequence on the power line from the main switch connected to the receiver to self bypass. When bypassed, the main switch regains direct control of the appliances. Simultaneously, besides bypassing the receiver, within five seconds the user may have the receiver memorize any key from any other remote to take over control of the appliances.

28 Claims, 5 Drawing Sheets

WIRELESS REMOTE CONTROL FOR ALTERNATE CURRENT (A.C.) ELECTRICAL LIGHTING AND APPLIANCES WITH LEARN FUNCTION

BACKGROUND OF THE INVENTION

This invention relates to an apparatus and method for the application of wireless remote controller for using a learning infrared frequency transmitter and a plurality of infrared frequency receivers so as to control lighting/electrical appliances connected directly to the receivers; and also take over direct control of any home equipment by learning the codes from the original infrared remote controllers.

The present invention provides the capability of controlling light intensity, 24-hour programmable daily timer, a set of selectable sleep timer of 30-minute, 60, minute, 90-minute or 120-minute and ON/OFF switching for the lighting/electrical appliances connected to the receivers. Lighting and electrical appliances connected to the receivers will also benefit from the invention's energy saving interval timer. A 1/5 interval timer means that the timer has a one-minute ON time and 5-minute OFF time. Many setting can be chosen by the user on the X/Y interval timer (X=ON time and Y=OFF time). Both X and Y starts from 1-to-99 minute. This interval time will repeat every X+Y minutes. This feature is very useful for energy savings for heating and ventilation especially for a smoking room and also for working people who wants to return home to a comfortable, cool, well circulated and refreshed house.

The present invention also provides the capability of learning, memorizing and unifying all the infrared remote for home comfort and entertainment equipment into one master remote controller to take over direct control of the following equipment, comprising: Television, Air Conditioning Unit, Compact Disk Player (VCD), Video Cassette Recorder (VCR), Satellite, Digital Compact Disc (DVD), Karaoke and Hi-Fi Home Audio System.

Another capability provided by the present invention is that the main ON/OFF switch connected to the receiver can regain direct ON/OFF control of the lighting/electrical/appliances or equipment by performing the following successive sequences: ON-OFF-ON-OFF-ON from the main switch of the receiver. The receiver will activate an electronic self-bypass upon detecting this sequence from the main switch. The lighting/electrical appliances will now function as normal (ON/OFF control by the main switch) thus bypassing the receiver. This feature is especially useful if the user loses or misplaces the hand held transmitter. In tandem, within 5 seconds after the receiver detects the successive ON-OFF-ON-OFF-ON sequence from the main switch, besides bypassing the receiver, the user has the option of having the receiver memorize any key from any other infrared remote to take over the control of the lighting/electrical appliances. If the user chooses this option, the control of the lighting or electrical appliances will be directly transferred to that key on that infrared remote.

A mechanical safety bypass switch is also included in the event the receiver malfunctions due to unforeseen circumstances.

Currently, to control lighting, a fan, equipment or any electrical appliances using Alternating Current power supply in the house or factory (e.g., AC 110-Volts or AC 220-Volts) requires a person to manually toggle ON or to manually toggle OFF the mechanical switches that are wired and attached to the wall.

Devices like the household air conditioner, television or audio/video equipment also utilize coded infrared frequencies to control the functional operation of the equipment on the condition that the main power switch connected to these equipment are already manually switched to the ON position. These remote controls are restricted in application since they are built-in for that particular equipment only and cannot be used for lighting, ventilator, fan control or other electrical appliances if and when necessary. Thus, it s confusing and also an inconvenience to have so many remote controls.

U.S. Pat. No. 4,418,333 (Schwarbach et al November 1983), U.S. Pat. No. 5,160,924 (Conil et al November 1992) and U.S. Pat. No. 4,200,862 (Campbell et al April 1980) disclose methods of controlling appliances within a building with central control unit and a plurality of slave units. These slave units receive their addresses from a central unit that is coupled to and transmits the code through the main power line. Some disadvantages noted in these patents are that coupled signals can be received through the power line by neighboring buildings' equipment, programming of many electrical addresses at the central unit and slave units, and the appliances can be controlled only through a central transmitter or where extra transmitters are installed.

The inadequacies of the inventions disclosed by prior art are evident. Accordingly, for the foregoing reasons, there is a need for a remote control system to overcome the drawbacks mentioned above.

SUMMARY OF THE INVENTION

To overcome the limitations of the related art described above, and to overcome other limitations that will become apparent upon reading and understanding the present specification, the invention relates to a system for the application of wireless remote control using infrared frequency transmitter and a plurality of infrared frequency receivers so as to control connected lighting/electrical appliances in tandem with:

1. 24-hour programmable daily timers;
2. Sleep timers of 30-minute, 60-minute, 90-minute, 120-minute,
3. Energy saving interval timer. A 1/5 interval timer means that 1-minute ON time and five-minute OFF time. Many settings can be chosen by the user on the X/Y interval timer (X=ON time and Y=OFF time). Both X and Y starts from 1-to-99 minutes. This interval timer will repeat every X+Y minutes.
4. Main ON/OFF switch connected to the receiver can regain direct ON/OFF control by performing the following successive sequence ON-OFF-ON-OFF-ON (the receiver will activate an electronic self bypass upon detecting this sequence from the main switch). This feature is especially useful if the user loses or misplaced the hand held transmitter.
5. In tandem, within five seconds after the receiver detects the successive ON-OFF-ON-OFF-ON sequence from the main switch, besides bypassing the receiver, the user has the option to memorize any key from any other infrared remote to control the lighting/electrical appliances while he searches for the master remote controller that was misplaced. By pressing any key from any other infrared remote controller within five seconds upon detecting the self bypass sequence, the receiver will memorize the code from that remote control. If the user chooses this option, the control is directly transferred to that key of that infrared remote controller.

6. As a safety measure, a mechanical bypass switch is also included in the event the receiver malfunctions due to unforeseen circumstances.
7. Master remote controller capabilities of learning, memorizing and unifying all the infrared remote controllers for home comfort and entertainment equipment into one master remote controller.
8. Flexible selectable code for easy installation of multiple adjacent ON/OFF receivers.
9. Fix code for light intensity control receiver.
10. Simple and reliable AC-to-DC power conversion for the receiver. A fuse is also added as a further safety measure.
11. Sensor control back lit keypad which will light up during any key press. To conserve energy, a light sensor will only enable the lighting of the keypad at low ambience light levels, for example in the evening or during nighttime when the lights are OFF.

In one embodiment, the invention comprises of an electronic means whereby a transmitter transmits an infrared coded signal which is captured by an infrared receiver and decoded by a microprocessor prior to taking actions on the electrical appliances which are connected to the receiver either for light intensity control or ON/OFF applications. The advantage of infrared frequency transmission is line of sight control, therefore electrical appliances or lighting in nearby rooms or building installed with the same apparatus will not be affected and will not receive the transmitted signals. Thus, receivers in different rooms can share the same code.

In one embodiment, the invention comprises of a 24-hour timer where the master remote controller will transmit 24-hour information which include the ON-time and the OFF-time to the receiver(s). Upon receiving this information, the receiver(s) will turn ON the lights and turn OFF the lights in accordance with the time setting received. These actions will be repeated every 24-hour until the setting is cancelled. Still in one embodiment, the invention comprises of a set of selectable sleep timers which are 30-minute, 60-minute, 90-minute or 120-minute duration. The receiver will take one action only on sleep timer. The master remote will transmit a sleep timer setting, for example 30-minute, to the receiver. After 30-minute from receiving the sleep timer information, the lights connected to the said receiver will switch OFF accordingly.

Still in one embodiment, the invention comprises an energy saving interval timer. A 1/5 interval timer means that the timer has a 1-minute ON time and 5-minute OFF time. Many settings can be chosen by the user on the X/Y interval timer (X=ON time and Y=OFF time). Both X and Y starts from 1-to-99 minutes. This interval timer will repeat every X+Y minutes. This feature is very useful for energy savings especially for smoking room with air conditioning and also for working people who wants to come home to a comfortable, cool and refresh house. The energy saving interval timer can be used for heating and ventilation is programmable through the transmitter using specially transmitted sequences.

Yet in one embodiment, by doing the following successive sequence on the main switch: ON-OFF-ON-OFF-ON, the main switch connected to the receiver can regain direct ON/OFF control of the lighting or electrical appliance. The receiver will activate an electronic self-bypass upon detecting this sequence, and the lighting/electrical appliances will now function as normal (ON/OFF control by he main switch) thus bypassing the receiver. This embodiment is especially useful if the user loses or misplaces the master remote controller.

In another embodiment, in tandem within five seconds after the receiver detected the successive ON-OFF-ON-OFF-ON sequence from the main switch, besides bypassing the receiver, the user has the option having the receiver memorize any key from any other infrared remote to take over the control of the lighting/electrical appliances. By pressing any key from any other infrared remote within five seconds after detecting the self-bypass sequence, the receiver will learn and memorize the code from that infrared remote. If the user chooses this option, the control of the lighting or electrical appliances will be directly transferred to that key on that infrared remote. This is a useful feature that can be used while the user searches for the master remote controller that was misplaced.

In another embodiment, a mechanical safety bypass switch is also included as a safety measure in the event the invention malfunctions due to unforeseen circumstances.

In another embodiment, the master remote controller has the capability of learning and memorizing the infrared codes so as to unify all the infrared remote for any home comfort and entertainment equipment into one master remote controller. For example, infrared remote controllers for the Television, Air Conditioning Unit, Compact Disc player (VCD), Video Cassette Recorder (VCR), Satellites, Digital Compact Disc (DVD), Karaoke and Hi-Fi Home Audio System can be unified into one master remote controller. The infrared remote controllers of any equipment can be learned and memorized by this invention. By transmitting the infrared instructions into the sensor at the rear end of the master remote controller, the frequency, the format, the code and the protocol will be decoded by the microprocessor and memorized in accordance to the buttons assigned. This may be repeated for all the keys to be unified into the master remote controller. Upon completion of these steps, the hand held transmitter is now ready for use as the master remote controller.

Yet, still in one embodiment, the ON/OFF receiver of the present invention is allocated four programmable codes which can be selected through the transmitter using special transmit sequences to the receivers during installation. This option is to enable installation of four independent receivers adjacent to each other or within 50-feet proximity.

Still in one embodiment, the light intensity control receiver is allocated a fixed set of code. The master remote controller unit of this invention is pre-coded and therefore, no programming is needed.

Still in one embodiment, since the present invention requires different types and levels of Direct Current (DC) power therefore, a simple low heat emission AC to DC power management circuit is used to convert either AC 110-volt or AC 220-volt to DC power without using a transformer. The small size and low heat emission of the circuit makes the invention perform reliably. Especially when the invention's receiver is enclosed and flush mounted to the wall. A fuse is included as a good practice of safety.

In another embodiment, the sensor control back lit keypad is utilized to visually assist the user in selecting the correct control keys from the master remote controller in a low ambient light environment. The keypad will light up during any key press. To conserve energy, a light sensor will only enable the lighting of the keypad at low ambient light levels, for example in the evening or during nighttime when the lights are OFF.

One advantage of the present invention is the ability to unify infrared remote controller of major equipment into one master remote controller. This master remote controller can be used independently or in tandem with the invention's receiver(s) that is flexible and simple enough to be installed without any elaborate setting or programming.

BRIEF DESCRIPTION OF THE DRAWING

Referring now to the drawings in which like reference numbers represent corresponding parts throughout, where:

FIG. 1, is a general view of one embodiment of the invention's applications for controlling home entertainment equipment, lighting, ventilation fan, appliances and the like;

DETAILED DESCRIPTION OF THE PREFERED EMBODIMENT

In the following description of the specific embodiments, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

Figure 1:
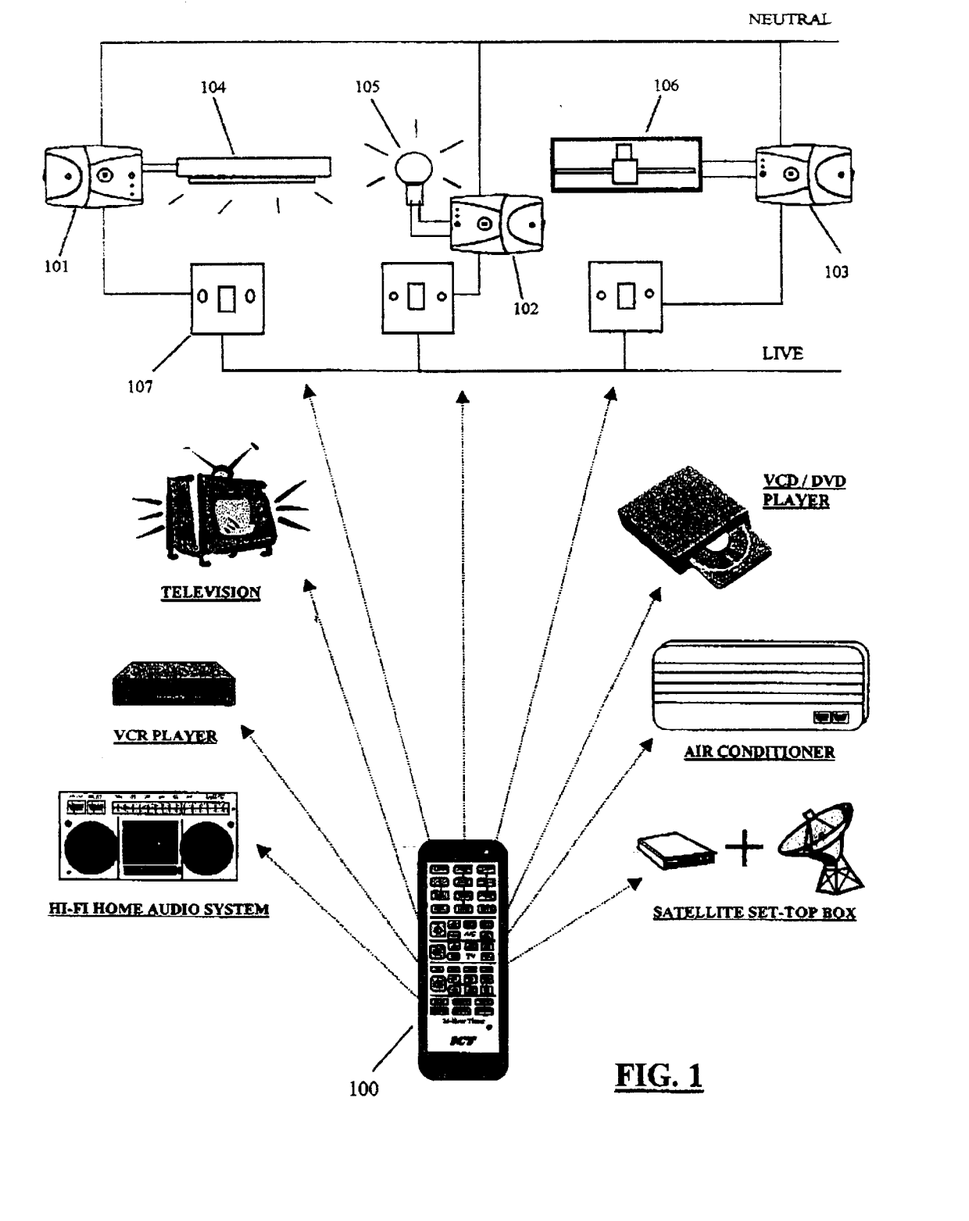

FIG. 1 is a general view of one embodiment of the invention's capabilities for controlling various home entertainment equipment, lighting, ventilation fan and electrical appliances in accordance with the present invention. A master remote controller 100 controls home entertainment equipment and appliances which are connected to 50/60 hertz AC 110 Volts or 220 Volts power supplies. An ON/OFF receiver unit 101, a light intensity control (dimmer) receiver unit 102 and a ventilation fan receiver unit 103 are representative of one embodiment of the invention. The invention's wireless receiver is flush mounted onto the wall or ceiling. It is also appreciated that the invention's wireless receiver can be mounted to the wall and ceiling in other manners such as on the external surface of the wall. Examples of household appliances that may be controlled by the invention are: the normal ON/OFF lighting 104, the normal light bulb or halogen lamp 105 for light intensity dimming control and the ventilation fan 106.

Also illustrated are the individual main switches 107 connected to each of the appliances. By performing the following successive sequence on the main switch: ON-OFF-ON-OFF-ON, the main switch connected to the receiver can regain direct ON/OFF control of the lighting or electrical appliance. The receiver will activate an electronic self-bypass upon detecting this sequence from the main switch. The lighting/appliances will now function as normal (ON/OFF control by the main switch) thus bypassing the receiver. This feature is especially useful if the user loses or misplaces the master remote controller.

No external receivers are required for equipment and home entertainment devices like DVD, VCD, VCR, TV, Air Conditioner, Hi-Fi Audio System and satellite Setop-Boxes since these devices have built-in infrared receivers. Upon learning the codes of the remote controller from each respective equipment, the hand held master remote controller is now capable of direct communication with the receivers of each equipment (refer to FIG. 2 for the learn mode).

Figure 2:
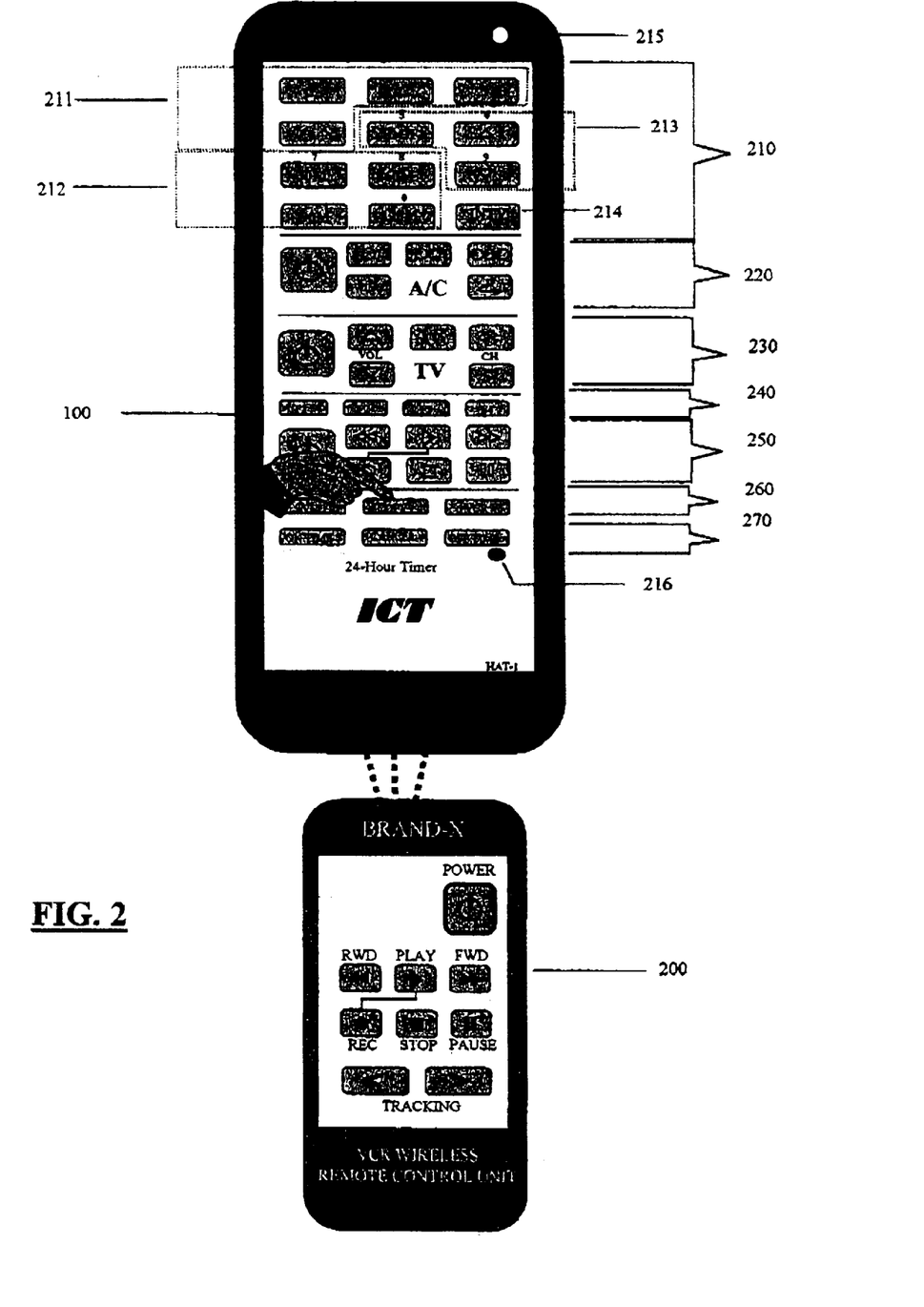
FIG. 2 shows one embodiment of a master remote controller learning from another remote control.

FIG. 2 shows the master remote controller learning the codes from another remote controller, 200, which is representative of an infrared remote controller from any equipment. In one embodiment, the master remote controller 100 to be able to communicate with the receiver of each lighting/electrical appliance or equipment. The following sequence 100 may be performed during the learn mode:

1. Place the remote controller 200 directly behind the master controller 100;
2. Press the COPY key on the master remote controller 100;
3. Press VCD or VCR key if learning VCD or VCR codes (Skip this step if not learning VCD or VCR codes);
4. For example, press the VCR Power key on the remote controller 200 of the VCR;
5. Press the associated key on the master remote controller 100 to be assigned the VCR Power key;
6. End of Learn.

To learn other keys from the same original remote controller 200, step 2 is repeated and the appropriate key in step 3, 4 & 5 is selected until all the keys have been learned. If learning from the present original remote controller is completed and is required for learning another remote controller, for example a VCD remote controller, the process may be repeated restarting from step 1.

There are altogether seven sections on the master remote controller 103 and only sections 220, 230, 240 and 250 are required for learning from the original remote controller:

210—Preprogram for this invention's receivers. This section contains ON/OFF control 211, sleep timer control 212, light intensity control 213 and energy saving interval timer 214;

220—Recommended learning and memorizing for fan, ventilator or air conditioning remote controller;

230—Recommended learning and memorizing for television remote controller;

240—F1, F2, F3, F4 learn from any remote controller;

250—Selectable learn for VCD or VCR (Select VCR key during VCR learn and select VCD key during VCD learn);

260—Learn mode activation and VCD/VCR memory select; and

270—24-hour timer setting for section 210.

Sections 220, 230, 240, 250 and 260 are flexible. The users do not have to follow strictly the recommended devices for these sections. Other sections include a light sensor 215 which will enable the keypad back lighting when the keypad is pressed and when the ambient light level is low and an LED 216 that blinks during 24-hour programming for section 210.

Figure 3A:
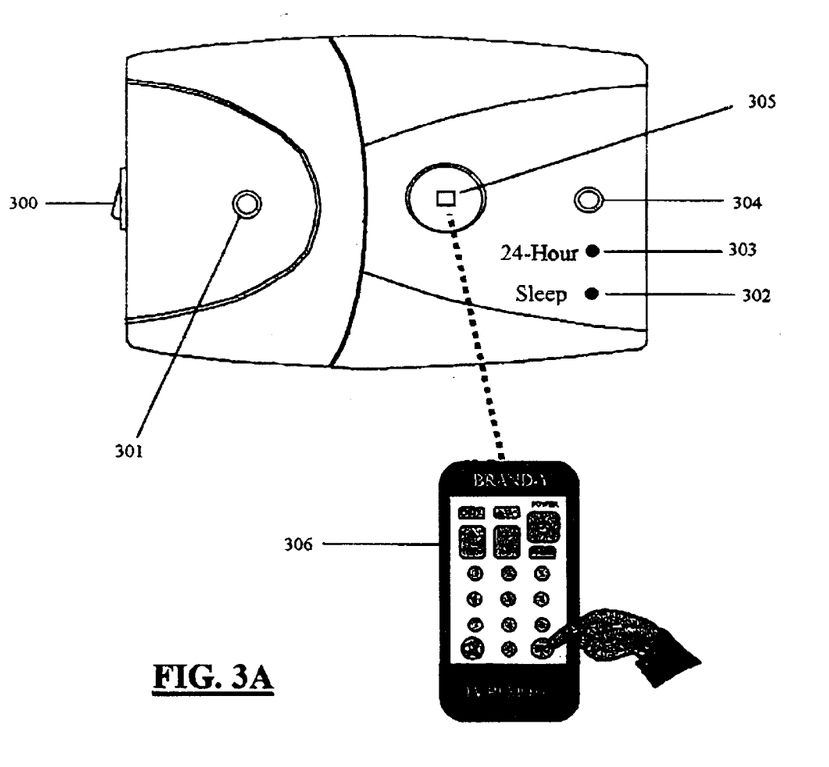
FIG. 3A shows one embodiment of an infrared receiver control unit (top view) learning the code from another infrared remote.

FIG. 3A illustrates one embodiment of a receiver control unit (receiver hereinafter) from a top view showing the receiver learning the code from another infrared remote 306. The receiver includes a mechanical bypass switch 300 to bypass the receiver in the event the receiver malfunctions, screw holes 301, 304 are use for screws to hold the PCB and the top face plate casing 307, to the bottom casing 308 (as shown in FIG. 3B).

The receiver further includes an LED 302 that is ON when the sleep timer is activated and OFF when deactivated; an LED 303 that is ON when the 24-hour-timer is activated and OFF when deactivated and an infrared sensor 305 for the receiver. Besides receiving normal infrared control code to control lighting and electrical appliances, the infrared sensor 305 on the receiver is also for learning and memorizing codes from other infrared remote controllers. When the receiver detects the successive ON-OFF-ON-OFF-ON sequences from the main switch, in tandem within five seconds, besides bypassing the receiver, the user has the option of having the receiver memorize any key from any other infrared remote controller to takeover the control of the lighting/electrical appliances. By pressing any key from any other infrared remote within five seconds after detecting the bypass sequence from the main switch, the infrared sensor 305 on the receiver will capture the infrared frequency code and forward to the microprocessor (same microprocessor as described in 403 in FIG. 4) to learn and memorize the code from that remote control. If the user chooses this option, the control of the lighting or electrical appliances will be directly transferred to that key on that infrared remote. This feature is useful while the user searches for the master remote controller that was misplaced.

Figure 3B:
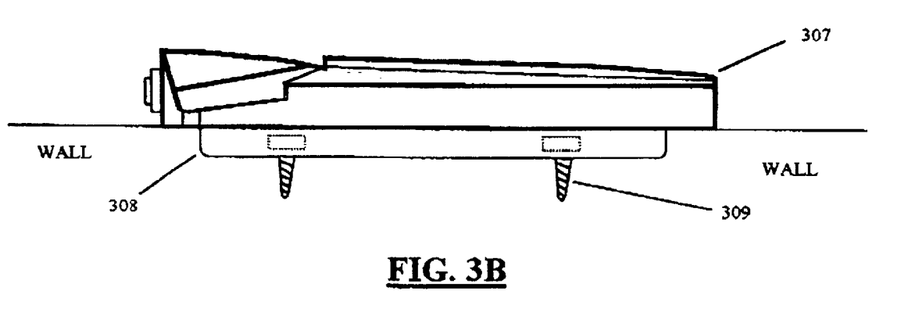
FIG. 3B shows one embodiment of an infrared receiver control unit (side view) in a flush mounted position.

FIG. 3B illustrates one embodiment of a receiver flush a mounted onto a wall (side view) showing the top face plate casing 307 and the bottom casing 308 together. The screws 309 lock the bottom casing 308 onto the wall.

Figure 4:
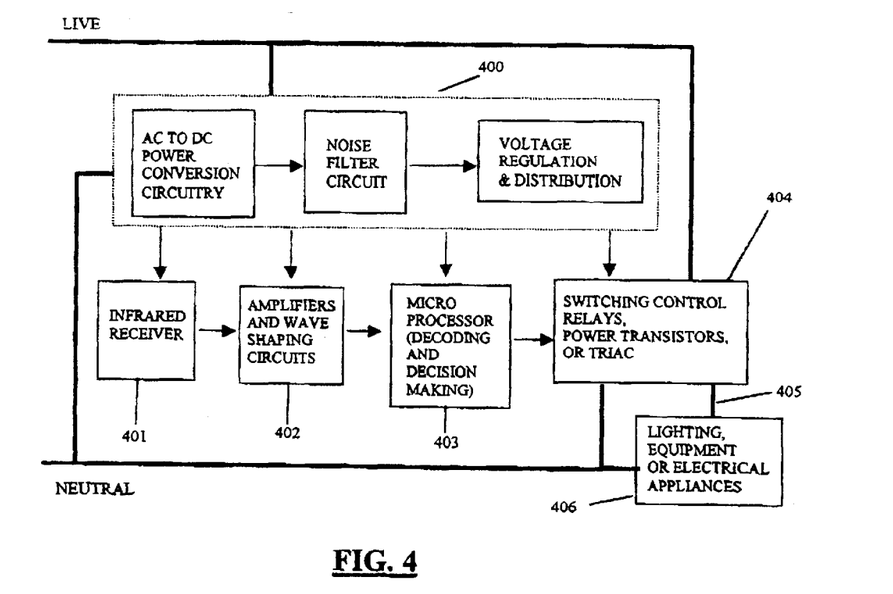
FIG. 4 is one embodiment of a block diagram of one embodiment of a receiver.

FIG. 4 illustrates a block diagram of one embodiment of a receiver. The circuitry 400 converts Alternate Current (AC) to Direct Current (DC) which goes through a noise filter and a voltage regulator and distributor circuit before the power is distributed to all the electronics in the receiver. Incoming information is received at the infrared receiver 401. To prevent any misinterpretation of the digital information, amplifiers and wave shaping circuitry 402 will amplify and clean up the digital signals before passing them to the microprocessor 403 for further interpretation. Upon complete decoding of the information, the microprocessor 403 will decide and act accordingly through switching control 404. The power line 405 is dictated by the switching control 404 whether to activate the timers, turn ON or OFF the relevant appliances or control the intensity of the lights. The equipment, lighting and other electrical appliances connected to the receivers are represented by block 406.

Figure 5:
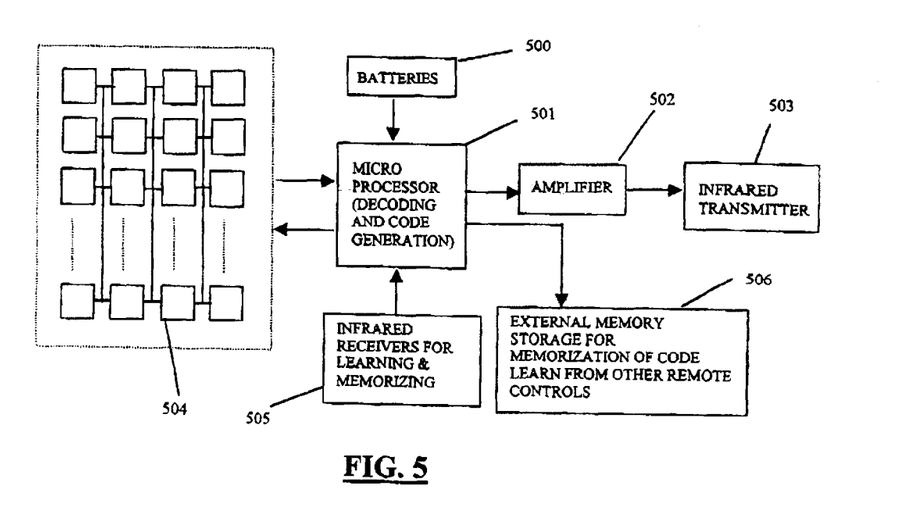
FIG. 5 is one embodiment of a block diagram of one embodiment of a transmitter.

FIG. 5 illustrates the block diagram of one embodiment of a master remote controller. As this is a handheld infrared transmitter, batteries 500 are used to power the transmitter electronics. The diagram also illustrates the keypad 504 that the user key in the commands or program the timer to microprocessor 501, which is the same microprocessor 403. Upon complete scanning and decoding of the information from the keypad 504, the microprocessor 501 will generate the appropriate code which is then amplified by amplifier 502. The infrared transmitter 503 will then convert the digital information into an infrared frequency for transmission. The microprocessor 501 is instrumental in the learning and memorizing of new codes from other remote controllers. The infrared codes from other remote controllers are received from infrared sensor 505, which then forwards this information to the microprocessor 501. The microprocessor 501 will breakdown the infrared code into its fundamental components (e.g., the carrier frequency, transmission protocol, timing, representation and format) for analysis. Upon completion of analysis, the microprocessor 501 has completed the learning process. The information from the completed analysis are stored and memorized in external memory circuit 506. The microprocessor 501 is now capable of direct communication with the equipment previously controlled by the other remote controllers.

Figure 6:
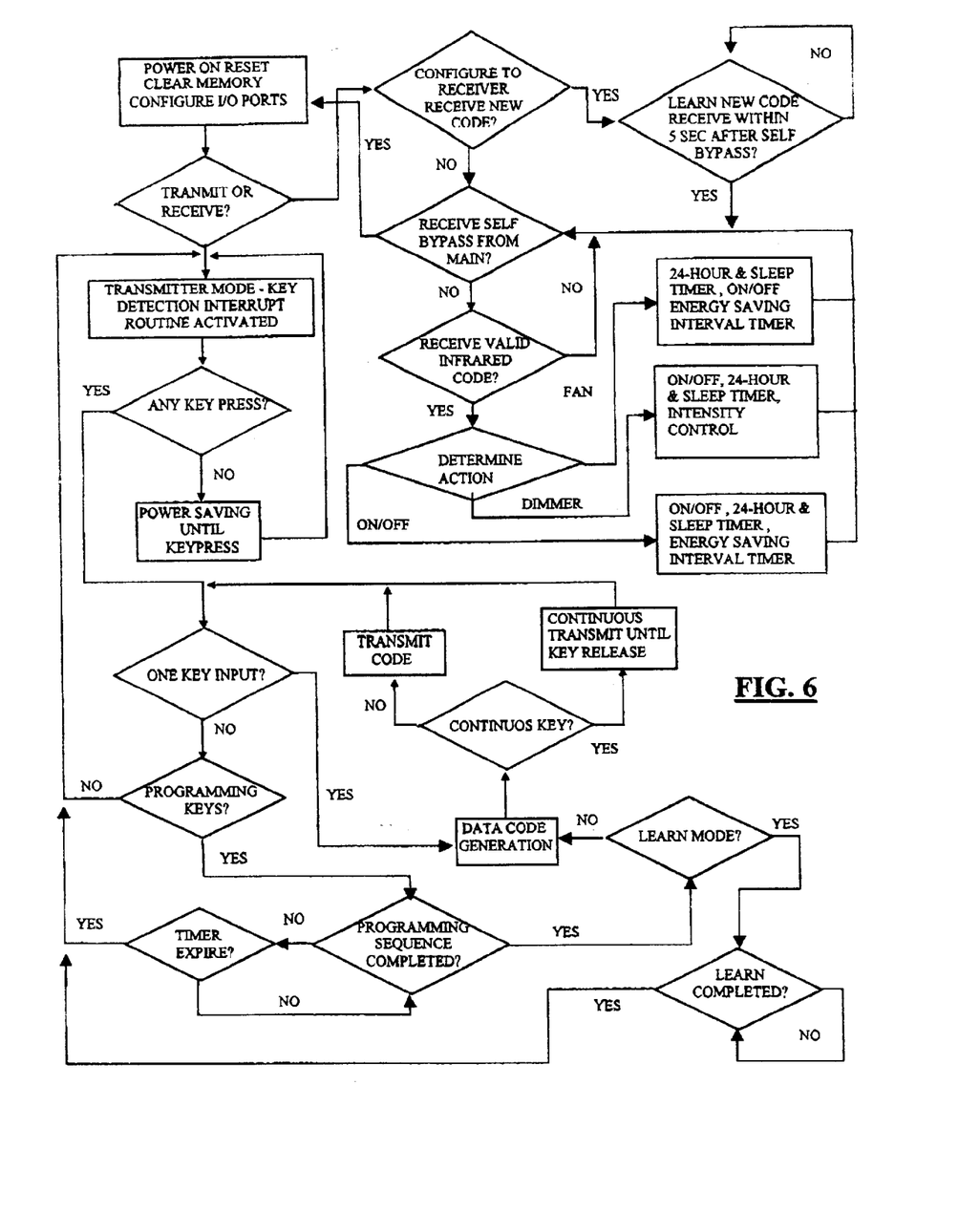
FIG. 6 is one embodiment of a flowchart of one embodiment of a software in the microprocessor.

FIG. 6 illustrates a flow chart of one embodiment of a microprocessor used n this invention which can be configured into transmitter or receivers depending on the settings on the printed circuit board at the factory. Upon power up the microprocessor will reset and check if the remote control transmitter or receiver are configured. If transmitter configuration, the microprocessor will set all output to active '0' and scan to detect any key press. If no key press is detected, the microprocessor will go into power saving mode to preserve battery power until a key press is detected. Upon key press detection, the microprocessor will wake up to scan and determine which key is activated and in turn determine the type of data code to be generated. For continuous key, the appropriate digital code will be transmitted in infrared frequency until that key is released. One complete set of the appropriate digital code will be transmitted in infrared frequency for single key transmission. The microprocessor will check for new key press for new commands or go to power saving mode to preserve the battery until a new key press is detected.

As for the programming keys, the microprocessor will wait until the programming sequence consisting of a few keys are completed or the timer has expired before taking any action. There are two types of programming sequences, the learn mode programming sequence and the timer programming sequence. In the learn mode, the microprocessor will activate the infrared sensor to capture, learn and memorize the infrared code and assign a key on the transmitter. In the timer mode, the microprocessor will generate and transmit time information in infrared frequency to the receivers for further action (in accordance with the time settings).

Otherwise, if improper or incomplete programming sequence is detected within a preset duration, the microprocessor ignores the programming sequence. The microprocessor will then concentrate on new key press detection for new commands or go to power saving mode to preserve the battery until a new key press is detected.

Alternatively, if the microprocessor detects the receiver setting, the microprocessor will check if there is a valid bypass sequence of ON-OFF-ON-OFF-ON from the main switch. If no valid bypass sequence is detected, the receiver will continuously scan for both valid bypass sequence from the main switch and also scan for valid infrared frequency code. If a valid self bypass ON-OFF-ON-OFF-ON sequence from the main switch is detected, the microprocessor will reset the entire system, thus all previous setting will be invalid and the main switch will now have direct ON/OFF control of the electrical appliances connected to the said receiver. In tandem, within five seconds after detecting the self-bypass sequence, if the receiver infrared sensor detected any infrared frequency transmission, this infrared code will be learned by the microprocessor and stored in the memory as a new code. Thus, the new code will be assigned to the lighting or electrical appliances connected to the said receiver—therefore, control of the lighting or electrical appliance is effectively transferred to the new code (which can be from any infrared remote controller). Thus, control of the lighting or electrical appliances will be directly transferred to that key on that infrared remote that transmitted the new code. After the five seconds, the receiver will proceed as normal checking for valid infrared code. The proper action will be taken depending upon whether the code is for ON/OFF, light intensity control, 24-hour timer, sleep timer or energy saving interval timer. After the appropriate action is taken the receiver will go back to continuously scanning for valid bypass sequence from the main switch and also for valid infrared frequency code.

The foregoing description of the specific embodiments of the invention has been presented for the purposes of illustration and description. It is not intended to be exhaustive or to limit the invention and description. It is not intended to be exhaustive or to limit the invention to the precise form disclosed. Many modifications and variations are possible in light of the above teaching. It is intended that the scope of the invention be limited not with this description, but rather by the claims appended hereto.

We claim:

1. A remote control system for remotely controlling a plurality of alternating current electrical appliances, comprising;
    a plurality of wireless receivers connectable to the alternating current electrical appliances; and
    a wireless remote control transmitter, located remote from the wireless receivers, for generating and transmitting coded infrared frequency to the wireless receivers to control the alternating current electrical appliances;
    wherein the wireless remote control transmitter comprises:
        means for generating and transmitting light intensity control infrared instructions to the wireless receivers for controlling light intensity of connected lighting;
        means for generating 24-hour timer information to the wireless receivers to control daily activation and daily deactivation of the alternating current electrical appliances;
        means for providing a selectable set of sleep timer information to the wireless receivers to activate the alternating current electrical appliances within a specified duration;
        means for generating energy saving interval timer information to the wireless receivers, for the wireless receivers to repeatedly control an activation time and a deactivation time of the alternating current electrical appliances;
        means for learning and memorizing infrared frequency instructions from other wireless remote control transmitters for unifying as many wireless remote control transmitters as permitted into one master remote controller;
        a light sensor for determining activation of keypad back lighting during a key press when an ambient light level is low, for enabling a user to see the wireless remote control transmitter in darkness; and
    wherein of the wireless receivers comprises:
        means for activating a self-bypass upon detecting a predetermined sequence from a main switch connected to the wireless receiver;
        upon detecting the predetermined sequence from the main switch connected to the wireless receiver, in tandem within five seconds besides bypassing the wireless receiver, means for capturing an infrared frequency code corresponding to a key from another infrared remote and forwarding the infrared frequency code to a microprocessor for learning and memorizing of the infrared frequency code and directly transferring control of the alternating current electrical appliance to that key of the other infrared remote; and
        a dual safety mechanism comprising a mechanical safety bypass switch and a fuse provided as a safety measure in case the wireless receiver malfunctions.

2. A remote control system according to claim 1, further comprising:
    a receiver top face plate casing comprising a receiver opening to position the wireless receivers; and
    means for securing the top face plate casing and a bottom casing for externally mounted installation and flush mounted installation, the securing means comprising supporting columns and screw holes for screws securing PCBs to the top face plate casing and the supporting columns and screw holes for screws securing the bottom casing to a wall.

3. A remote control system according to claim 1, wherein the light intensity control instructions further comprise:
    means for increasing light intensity, wherein the intensity increases as more infrared frequency coded instructions are received until the intensity is at a maximum or maintains a level of intensity upon cessation of further infrared frequency instructions;
    means for decreasing the light intensity, wherein the level of brightness decreases as more infrared frequency coded instructions are received until the intensity is zero or maintains a level of intensity upon cessation of further infrared frequency instructions;
    means for directly switching the light intensity to zero without having to decrease the light intensity until the light intensity is zero;
    means for switching the light intensity to a previous intensity wherein the microprocessor remembers the previous light intensity before the light intensity was switched to zero; and
    means for preserving bulb life wherein under microprocessor control the light intensity activates at half of maximum intensity and slowly increases, or immediately activates at the previous light intensity if the previous intensity is less than half of the maximum.

4. A remote control system according to claim 3, wherein the electrical appliance control circuit activates and deactivates the alternating current electrical appliances using a microprocessor for decoding infrared instructions and for activating and deactivating relays or triacs as instructed.

5. A remote control system according to claim 3, wherein current management of the light intensity performed using a microprocessor for deciding infrared instructions and for synchronizing with incoming AC waveforms and digitally triggering optically isolated triacs for controlling the light intensity of connected lighting.

6. A remote control system according to claim 1, wherein the 24-hour timer information is transmitted from the wireless remote control transmitter to the wireless receiver's microprocessor for repeated actions every 24 hours to activate or deactivate the connected alternating current electrical appliances upon reaching a specified time.

7. A remote control system according to claim 1, wherein the wireless remote control transmitter comprises selectable sleep timers of either 30-minute, 60-minute, 90-minute or 120-minute that delay deactivation of the alternating current electrical appliances connected to the wireless receivers for a specific period of time upon activation.

8. A remote control system according to claim 1, wherein the energy saving interval timer information is transmitted from the wireless remote control transmitter to the wireless receiver's microprocessor for performing repeated actions on the connected alternating current electrical appliances based on a predetermined activation time interval and deactivation time interval.

9. A remote control system according to claim 1, wherein the wireless remote control transmitter is capable of learning and memorizing infrared frequency instruction from another wireless remote control transmitter so as to unify the other wireless remote control transmitter into one master remote controller, further comprising:

an opening at a rear end of the wireless remote control transmitter where an infrared sensor is mounted to receive infrared frequency instructions, the infrared frequency instructions directed to a microprocessor for decoding, information extracted from the infrared frequency instructions being recorded into memory under direct control of the microprocessor; and a key on the wireless remote control transmitter assigned by the microprocessor to represent each instruction memorized.

10. A remote control system according to claim 1, wherein the wireless receivers are provided with an implementation to decode a successive ON-OFF-ON-OFF-ON activation/deactivation sequence on a power line from the main switch connected to the wireless receiver, activating the self-bypass upon detecting this sequence such that the main switch will regain direct activation/deactivation control of the alternating current electrical appliances connected to the wireless receiver even if the user loses or misplaces the master remote controller.

11. A remote control system according to claim 1, wherein the dual safety mechanism for improving the safety and reliability of the wireless receiver further comprises:

a receiver top face plate casing having a switch opening to position an AC rated mechanical switch to act as a bypass switch in case of an electronic malfunction; and a fuse mounted on a PCB which is mounted on the receiver top face plate casing to act as a safety overload control from the AC power supply.

12. A remote control system according to claim 1, wherein coded infrared frequency instructions are transmitted from the transmitter to the wireless receiver's microprocessor for decoding, the system further comprising:

an electrical appliance control circuit in at least some of the alternating current electrical appliances, wherein the electrical appliance control circuit comprises either triacs or relays for controlling the alternating current electrical appliances.

13. A remote control system according to claim 1, wherein the wireless remote control transmitter comprises a light sensor for monitoring ambient light levels; and wherein the keypad back lighting lights up upon detecting a key press on the wireless remote control transmitter when the ambient light level is below a predetermined level, to visually assist the user in accurately selecting their choice of control from the wireless remote control transmitter.

14. A remote control system according to claim 1, wherein the wireless receivers are electrically connected to the alternating current electrical appliances.

15. A remote control system according to claim 14, wherein the wireless receivers are connectable to the alternating current electrical appliances.

16. A remote control system according to claim 1, wherein the sleep timer information is 30-minute, 60-minute, 90-minute or 120-minute.

17. A remote control system according to claim 1, wherein the master remote controller is adapted to directly control of at least one of the group consisting of a television, a hi-fi audio system, a VCD, a VDR, a DVD, and a satellite receiver.

18. A remote control system according to claim 1, wherein the predetermined sequence comprises an ON-OFF-ON-OFF-ON activation/deactivation sequence from the main switch connected to the wireless receiver.

19. A method of remotely controlling a plurality of alternating current electrical appliances, comprising the steps of:

providing a plurality of infrared receivers connectable to the alternating current electrical appliances;

providing an infrared remote control transmitter that is capable of learning infrared codes from other infrared remote control transmitters so as to take over control of the equipment from the other infrared remote control transmitters:

generating a coded infrared frequency for the infrared receivers to control alternating current electrical appliances;

transmitting coded infrared frequency instructions from the infrared remote control transmitter to the infrared receivers; and activating a self-bypass upon detecting a predetermined sequence from a main switch connected to the infrared receiver; and upon detecting the predetermined sequence from the main switch connected to the infrared receiver, in tandem within five seconds besides bypassing the infrared receiver, capturing an infrared frequency code corresponding to a key from the other infrared remote control transmitter and forwarding the infrared frequency code to a microprocessor in the receiver for learning and memorizing of the infrared frequency code and directly transferring control of the alternating current electrical appliance to that key of the other infrared remote control transmitter.

20. A method according to claim 19, wherein control of the infrared receivers connected to the alternating current electrical appliances can be transferred to another infrared remote control transmitter by learning the codes from the other infrared remote control transmitter.

21. A method according to claim 20, wherein the infrared remote control transmitters and the infrared receivers are in working order.

22. A receiver for controlling a plurality of alternating current electrical appliances according to signals received from a remote controller, comprising:

an infrared receiver portion for receiving infrared signals transmitted by an infrared remote controller;

a microprocessor portion for decoding the infrared signals from the infrared remote controller;

an output control portion for controlling the alternating current electrical appliances according to the infrared signals received from the infrared remote controller; and means for activating a self-bypass upon detecting a predetermined sequence from a main switch connected to the infrared receiver; and upon detecting the predetermined sequence from the main switch connected to the infrared receiver, in tandem within five seconds besides bypassing the infrared receiver, means for capturing an infrared frequency code corresponding to a key from the other infrared remote control transmitter and forwarding the infrared frequency code to a microprocessor for learning and memorizing of the infrared frequency code and directly transferring control of the alternating current electrical appliance to that key of the other infrared remote control transmitter.

23. An apparatus for remotely controlling alternate current lighting and electrical appliances, comprising
   a) an infrared remote control transmitter and a plurality of infrared receivers connectable to alternating current electrical appliances;
   b) at least one of the group consisting of an interval timer, a sleep timer, and a 24-hour timer, the infrared control transmitter and infrared receivers working individually or in connection with the at least one timer;
   c) means for using the at least one timer as a time base for efficient energy management of at least one of the group consisting of heat ventilation, and air conditioning;
   d) means for the if receiver to activate self-bypass upon detecting a predetermined sequence on a power line from a main switch connected to the receiver; and
   e) upon detecting the self-bypass predetermined sequence, in tandem within five seconds, besides bypassing the infrared receiver, means for capturing the infrared frequency code corresponding to a key from another infrared remote and forwarding to a microprocessor in the receiver for learning and memorizing the code and directly transferring control of the electrical lighting or appliances to the key of the other infrared remote.

24. The apparatus of claim 23, wherein the at least one timer comprises the interval timer, and controls activation and deactivation of air-conditioning, heating and ventilation according to a programmed activation time (X) and a programmed deactivation time (Y) to decrease, maintain or increase a temperature of an enclosed area in an energy efficient manner wherein the activation time (X) and the deactivation time (Y) are programmed depending on a size of the area and a material enclosing the area, and the activation time (X) and deactivation time(Y) are programmable, and repeat in an interval of duration X+Y.

25. The apparatus of claim 24, wherein the at least one timer further comprises the 24-hour timer, wherein the 24-hour timer repeatedly determines when during a 24-hour period the air-conditioning, heating and ventilation are enabled and disabled.

26. The apparatus of claim 24 wherein the at least one timer further comprises the sleep timer, the sleep timer having a programed sleep period during which the air-conditioning, heating and ventilation are enabled, the air-conditioning, heating and ventilation being disabled after the sleep period.

27. The apparatus of claim 23, wherein the sequence to activate self-bypass is a successive ON-OFF-ON-OFF-ON.

28. The apparatus of claim 27, wherein if the infrared receiver detects the sequence to activate self-bypass and if no infrared frequency code is detected within five seconds, the main switch connected to the infrared receiver regains direct activation/deactivation control of the alternating current electrical appliances.

* * * * *